United States Patent
Wijnands et al.

(10) Patent No.: US 7,965,656 B1
(45) Date of Patent: Jun. 21, 2011

(54) BUILDING MULTIPOINT PSEUDO WIRES USING A MULTIPOINT LABEL DISTRIBUTION PROTOCOL (MLDP)

(75) Inventors: Ijsbrand Wijnands, Leuven (BE); Christopher Metz, Danville, CA (US); Arjen Boers, Sitges (ES); Luca Martini, Denver, CO (US)

(73) Assignee: Cisco Technology, Inc., San Jose, CA (US)

( * ) Notice: Subject to any disclaimer, the term of this patent is extended or adjusted under 35 U.S.C. 154(b) by 1419 days.

(21) Appl. No.: 11/444,059

(22) Filed: May 31, 2006

(51) Int. Cl.
*H04L 12/28* (2006.01)
*H04L 12/56* (2006.01)
*G06F 15/16* (2006.01)
*G06F 15/173* (2006.01)

(52) U.S. Cl. ..... 370/256; 370/390; 370/392; 370/395.6; 370/408; 370/432; 709/230; 709/238; 709/252

(58) Field of Classification Search .......... 370/254–256, 370/390, 397, 395.53, 431–432, 392, 395.6–395.65, 370/400–401, 408–409; 709/230, 238, 252
See application file for complete search history.

(56) References Cited

U.S. PATENT DOCUMENTS

| | | | |
|---|---|---|---|
| 7,590,115 B1 * | 9/2009 | Aggarwal et al. | 370/390 |
| 2002/0080720 A1 * | 6/2002 | Pegrum et al. | 370/236 |
| 2004/0100983 A1 * | 5/2004 | Suzuki | 370/432 |
| 2005/0044262 A1 | 2/2005 | Luo | |
| 2005/0220014 A1 | 10/2005 | DelRegno et al. | |
| 2005/0220022 A1 | 10/2005 | DelRegno et al. | |
| 2005/0271036 A1 * | 12/2005 | Cohen et al. | 370/351 |
| 2006/0187950 A1 * | 8/2006 | Bou-Diab et al. | 370/432 |

OTHER PUBLICATIONS

Label Distribution Protocol Extensions for Point-to-Multipoint Label Switched Paths, draft-minei-mpls-ldp-p2mp-00, I. Minei et al., Mar. 28, 2005, pp. 1-10.*
Label Distribution Protocol Extensions for Point-to-Multipoint and Multipoint-to-Multipoint Label Switched Paths, draft-minei-wijands-mpls-ldp-p2mp-00, I. Minei et al., Oct. 14, 2005, pp. 9-14.*
Minei, I., et al. "Label Distribution Protocol Extensions for Point-to-Multipoint and Multipoint-to-Multipoint Label Switched Paths," *Network Working Group Internet-Draft*, Oct. 2005.
Martini, L., et al., "Encapsulation Methods for Transport of ATM Over MPLS Networks," *Network Working Group Internet Draft*, Sep. 2005.
Martini, L., et al., "Encapsulation Methods for Transport of Ethernet Over MPLS Networks," Network Working Group Internet Draft, Nov. 2005.

* cited by examiner

*Primary Examiner* — Alpus H Hsu
*Assistant Examiner* — Jeremy Costin
(74) *Attorney, Agent, or Firm* — Brinks Hofer Gilson & Lione

(57) ABSTRACT

A method, apparatus and computer program product for building multipoint Pseudo Wires (PWs) using Multicast Label Distribution Protocol (MLDP) is presented. A multipoint PW leaf identifier (mTAI) is configured on one or more Layer 2 (L2) leaf interface(s) of a multipoint PW. A multipoint PW root identifier identifying the root of the multipoint PW is also configured and an opaque value is computed, the opaque value used in MLDP label mapping messages that will flow upstream towards a the root of the multipoint PW. The opaque value is computed from the multipoint leaf identifier and the multipoint root identifier. The PE leaf routers direct MLDP label mapping to the root PE router via a core network.

24 Claims, 6 Drawing Sheets

Set of egress L2 interfaces that are bound to the mLDP - built multipoint PW. They are identified by an mTAI

BUILDING MULTIPOINT PSEUDO WIRES USING A MULTIPOINT LABEL DISTRIBUTION PROTOCOL (MLDP)

BACKGROUND

Service providers (SPs) are seeking an efficient, scalable, yet simple means of distributing multicast data. There are a number of different approaches with trade-offs for each. Historically, the SP has either provided basic transport for multicast data where the subscriber is responsible for the replication or the SP provides multicast services where replication is done on behalf of the subscriber. The former model is very inefficient, as the subscriber must replicate the data onto each transport instance built in the SP; nevertheless, the architecture is simple for the provider to support. In contrast, the multicast service is much more efficient; however, it is much more complex for the SP to operate. In both cases, scalability is constrained by bandwidth efficiency or operational complexity, respectively. An ideal solution leverages the concepts of both the multicast transport and the multicast service mitigating the extreme compromises of either solution.

Psuedo wires (PW) are point-to-point (P2P) tunnels that carry Layer 2 (L2) Packet Data Units (PDU)s across a packet switched network (PSN). The PW is set up using directed Label Distribution Protocol (LDP) sessions between two provider edge (PE) routers and the one or more PWs are carried inside point-to-point (P2P) PSN tunnel Label Switched Paths (LSP)s (independently established using PSN tunnel signaling protocols) between the same two PE nodes. The directed LDP session is used to negotiate/advertise the PW parameters and the PW label. When an ingress PE router receives an L2 PDU, it pushes a PW label and then a PSN tunnel label on the MPLS stack. The PSN tunnel label is used to transport the MPLS packet to the egress PE router. The egress PE router uses the PW label to identify which outbound L2 interface the L2 PDU should be forwarded to.

Some applications require L2 PDUs to be replicated from one or more ingress (source) PE routers to multiple egress (target) PE routers. An example of such an application is video distribution. Given the point-to-point nature of PWs and PSN tunnels and the independent signaling machinery used for each, the only practical technique in use today to accomplish the one-to-many or many-to-many L2 multipoint behavior is to first establish P2P PSN tunnels from each source PE router out to N number of target PE routers (using PSN tunnel signaling protocols) and second, use directed LDP sessions to build the P2P PWs from the same source PE router out to the same N number of target PE routers.

SUMMARY

Conventional L2 multipoint mechanisms such as those explained above suffer from a variety of deficiencies. One such deficiency is that in conventional L2 multipoint network environments the source PE router must perform O(N) packet replication and the provisioning amount of work is $2*O(N^2)$, where O is the Order and N is the number of remote PEs to send packets to. As such, valuable network resources (i.e. bandwidth, provisioning expertise) are not optimized and a large N could introduce scalability problems.

Embodiments of the invention significantly overcome such deficiencies and provide mechanisms and techniques that provide use of a single protocol, Multipoint LDP (MLDP), along with configured or dynamically-computed multipoint PW leaf identifiers, to dynamically build single-source and multi-source multipoint PWs across an MPLS network. This reduces the provisioning effort to O(N) (versus the existing approach), optimizes bandwidth by performing PW packet replication in the core (rather than at the source PE) and combines PW and PSN signaling into a single protocol for the multipoint case. The method includes a technique to identify and bind the L2 leaf interfaces to a multipoint PW, to signal L2 leaf interface identification to the root of the multipoint PW, and to dynamically establish point-to-multipoint (P2MP) and multipoint-to-multipoint (MP2MP) LSP trees between ingress L2 interfaces on root PE router(s) and egress L2 leaf interfaces on the PE leaf routers.

In a particular embodiment of a method for building multipoint Pseudo wires (PWs) using Multipoint Label Distribution Protocol (MLDP), the method includes configuring a multipoint PW leaf identifier (mTAI) on the one or more Layer 2 (L2) interface leafs of a multipoint PW. The method further includes providing a multipoint PW root identifier identifying a source or root of the multipoint PW and computing an opaque value used in MLDP label mapping messages that will flow upstream towards the source or root of the multipoint PW, the opaque value computed from the multipoint PW leaf identifier and the multipoint PW root identifier. Additionally, the method further comprises directing, by PE leaf routers, MLDP label mapping messages to the root PE router via a core network.

Other embodiments include a computer readable medium having computer readable code thereon for building multipoint PWs using Multipoint Label Distribution Protocol (MLDP). The medium comprises instructions for configuring a multipoint PW leaf identifier (mTAI) on one or more L2 interface leafs of a multipoint PW and instructions for providing a multipoint PW root identifier identifying the root of the multipoint PW. The medium further includes instructions for computing an opaque value used in MLDP label mapping messages that will flow upstream towards the source or root of the multipoint PW, the opaque value computed from the multipoint PW leaf identifier and the multipoint PW root identifier, and instructions for directing, by leaf PE routers, MLDP label mapping messages to the root PE router via a core network. The medium further comprises instructions for replicating of PW-encapsulated L2 PDUs at branch points of a multipoint PW tree including a source or root of the multipoint PW, the replicating of PW-encapsulated L2 PDUs at branch points of a tree including a source or root of the multipoint PW comprises receiving L2 PDUs at the ingress L2 interface of the root PE router(s), imposing the multipoint PW label, and forwarding down the multipoint PW tree to all interested PE leaf routers and their respective egress L2 leaf interfaces.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for building multipoint Pseudo wires (PWs) using the Multipoint Label Distribution Protocol (MLDP) as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for building multipoint Pseudo wires (PWs) using Multipoint Label Distribution Protocol (MLDP) as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
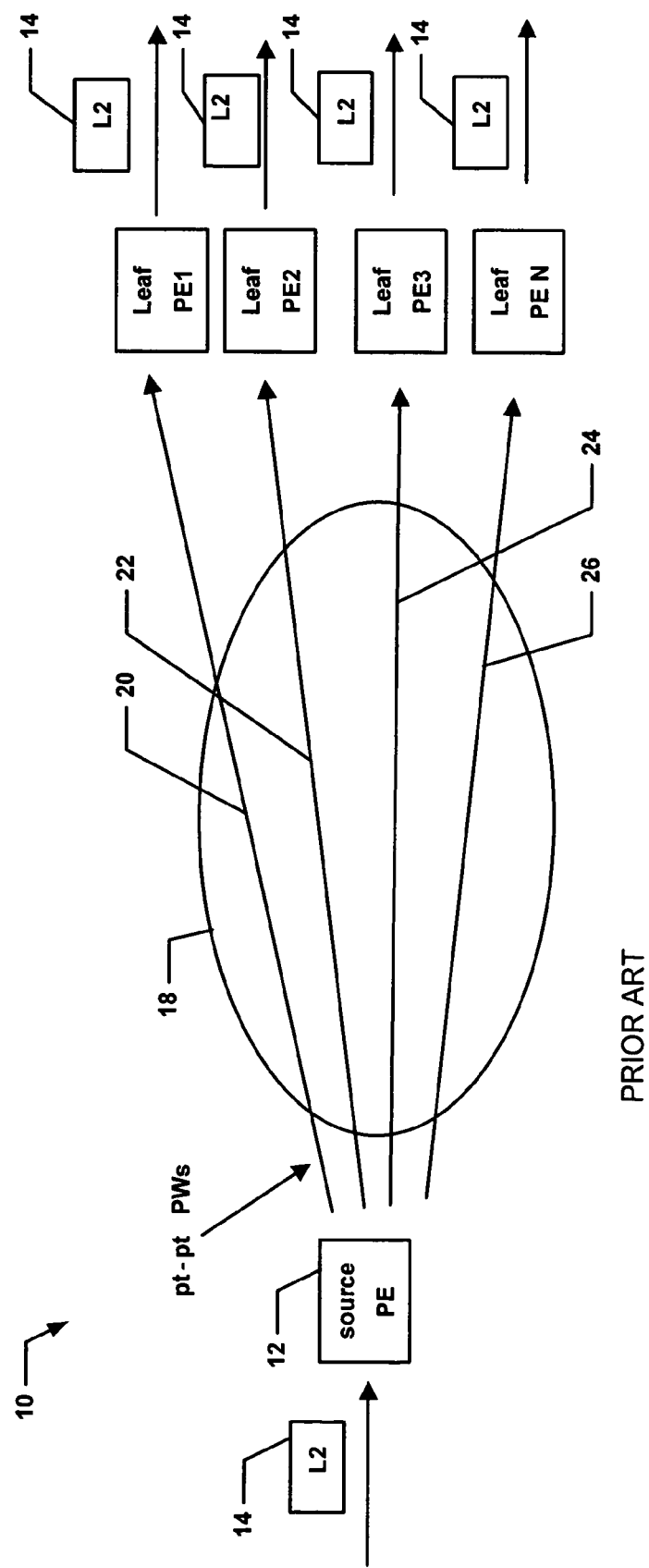
FIG. 1 depicts a prior art L2 multipoint network environment.

Referring to FIG. 1, a prior art L2 multipoint network environment 10 is shown. The environment 10 includes a first source Provider Edge (PE) router 12 (denoted as such because its ingress L2 interface is connected to the actual data source of the L2 PDUs), which is in communication with a plurality of other PE routers PE1-PEn via point-to-point PWs (20, 22, 24 and 26). L2 PDU 14 received by source PE 12 from another network device (not shown) must be replicated four times and then a copy may be forwarded on each discrete point-to-point PW leading to PE1 through PEn. Here the source PE 12 must replicate the L2 PDU four times before sending a copy over the four point-to-point PWs.

Figure 2:
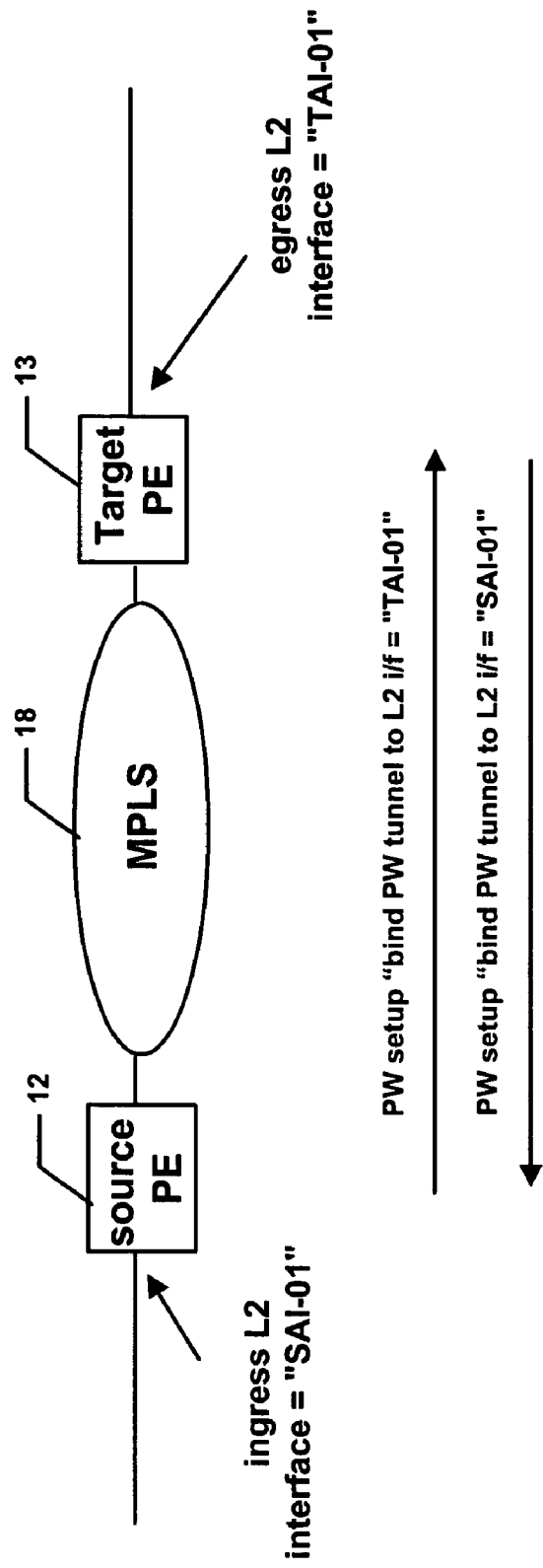
FIG. 2 depicts a target identifier used in point-to-point PW signaling to bind a L2 interface to a PW tunnel.

Referring now to FIG. 2, an example of the L2 interface identifiers used in the signaling of point-to-point PWs is shown. The ingress L2 interface on source PE 12 is labeled "SAI-01" and the egress L2 interface on target PE 13 is labeled "TAI-01". LDP setup messages that flow in each direction will instruct the PE that receives the message to bind the PW to the specified L2 interface identifier. This same notion is applied in this invention except a single L2 interface identifier (the multipoint PW leaf identifier) identifies a group of L2 interfaces.

Figure 3:
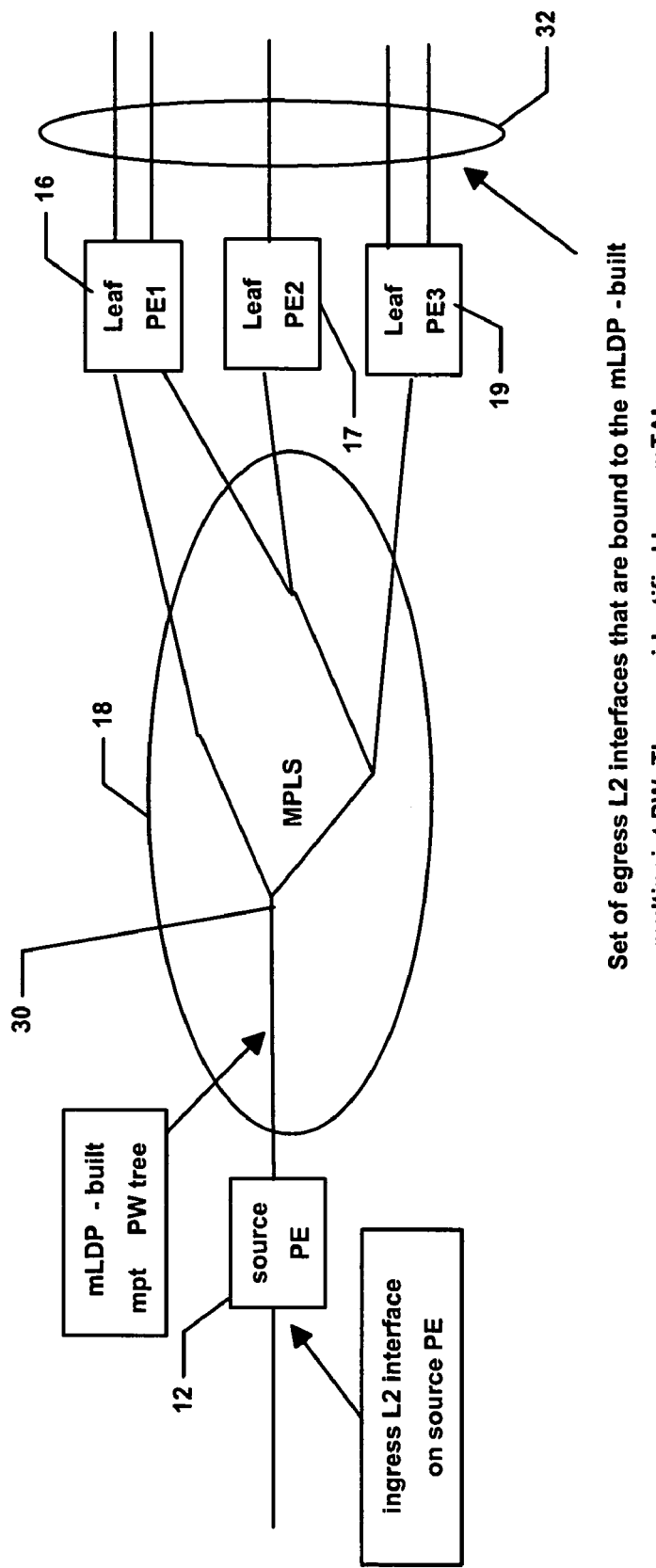
FIG. 3 depicts a network environment wherein an MLDP-built Multipoint Pseudo wire Tree has been built in accordance with embodiments of the invention.
Figure 4:
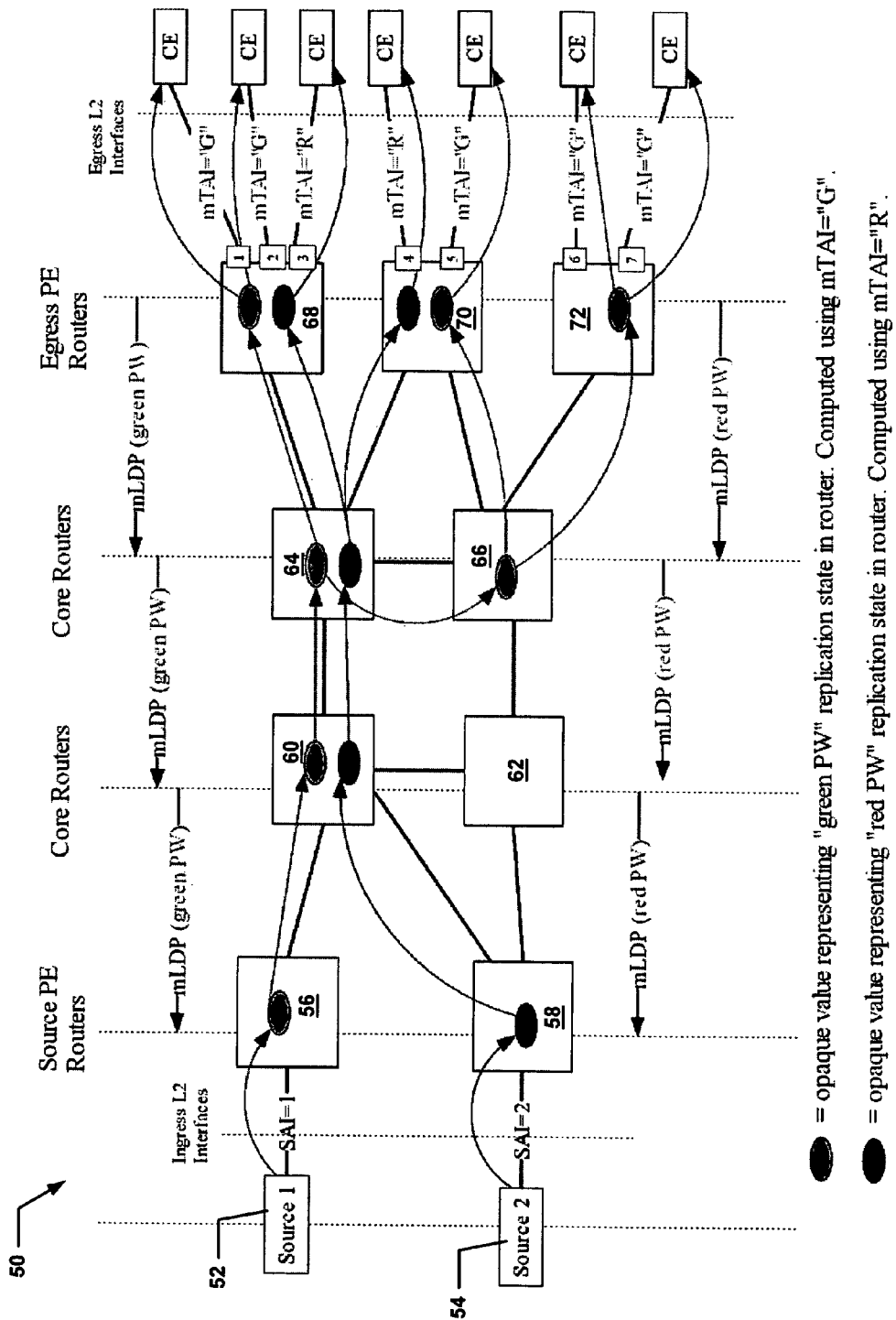
FIG. 4 shows a network environment showing multiple Pseudo wires in accordance with embodiments of the invention.

Referring now to FIGS. 3-4, Multipoint Label Distribution Protocol (MLDP) and multipoint PW leaf identifiers are used to dynamically build multipoint PWs across an MPLS backbone from one or more root PE routers branching out to multiple PE leaf routers. The purpose of the multipoint PW (a form of one-to-many or many-to-many LSP trees) is to replicate and deliver L2 PDUs injected into a source PE router(s) inbound L2 interface(s) out to interested PE leaf router(s) and their respective outbound L2 leaf interfaces. Replication of the PW-encapsulated L2 PDUs is performed at the branch points of the tree as computed and installed by MLDP.

Two items are configured on the PE leaf routers (16, 17 and 19 in FIG. 3). First a multipoint PW leaf identifier (also referred to as a multicast target attachment identifier or mTAI) is configured on the L2 leaf interface(s) that will become part of the multipoint PW. The L2 leaf interfaces with a common mTAI (32 in FIG. 3) may span one or many PE leaf routers. Just as all hosts belonging to a multicast group must have the same multicast group address, similarly, all L2 leaf interfaces that are part of the same multipoint PW will have the same mTAI. The mTAI can be a configured value, distributed via auto-discovery All distribution mechanisms (e.g. BGP), or algorithmically computed based on snooping of L2 or L3 multicast addresses on the L2 interfaces of the PE leaf routers.

Second the PE leaf routers (16, 17 and 19 in FIG. 3) are configured with a multipoint PW root identifier. This identifies the root of the multipoint PW (PE 12 in FIG. 3). For example the IP address of the root PE router or a value identifying the ingress or inbound L2 interface on that root PE router could be used as the multipoint PW root identifier.

The combination of the multipoint PW leaf and root identifiers is used to compute the opaque value contained in the MLDP label mapping messages that will flow upstream towards the source or root of the multipoint PW.

PE leaf routers (16, 17 or 19 in FIG. 3) direct their MLDP label mapping to messages to the root PE router (12) via the core network 18. The core routers will install unique state (containing an opaque value) for each multipoint PW. One opaque value state for each multipoint PW is installed on the PE and core routers along the tree.

Since the PE leaf routers use the same opaque value identifying the specific multipoint PW, the MLDP FEC entry will be the same for all PE leaf routers that belong to the tree. The core router will install a PW replication state and only forward one MLDP label mapping further upstream to the root PE router.

The root PE router is configured with the multipoint PW leaf identifier (mTAI) on the inbound L2 interface(s) receiving the L2 PDUs from the actual source. When an MLDP label mapping is received by the root PE router it will use the unique opaque value to associate the multipoint PW with the incoming L2 interface(s). The root PE can now receive L2 PDUs on the incoming or inbound interface(s), impose the multipoint PW label and then forward PW-labeled L2 PDUs down the tree to all interested PE leaf routers. At the last hop PE leaf router on the multipoint PW, the PW label is removed and the native L2 PDU is emitted out the one or more L2 leaf interfaces. This type of multipoint PW (30 in FIG. 3) is single-source and is a good application for the one-to-many replication of L2 packets across an MPLS backbone 18.

Another application of per-PW replication is the multi-source multipoint PW case. In an environment where there is not one root PE router, but rather multiple root PE routers with each being able to send and receive packets belonging to the same L2 multipoint stream. This is analogous to creating a virtual Ethernet between a set of PE routers. One way to build such a forwarding tree is to build a multipoint-to-multipoint (MP2MP) LSP that serves as a multi-source multipoint PW. Each PE router wishing to participate in this type of multipoint PW is configured with the same mTAI value on the L2 interface(s) it is willing to receive and forward traffic on. An MP2MP LSP is built towards a root of the tree. This can either be a root PE router or a core router. It is convenient to choose the root of the tree somewhere central in the network. An MP2MP LSP will provide a loop free distribution tree between the PE routers.

It is also possible to built single-source and multi-source multipoint PWs by performing protocol independent multicast/internet group management protocol (PIM/IGMP) snooping on the L2 interfaces of the PE leaf routers. A "default" multi-source multipoint PW is built between all the PE routers that wish to participate in the multipoint PW. On this multipoint PW all the multicast control packets are forwarded. The PE routers snoop the PIM and IGMP packets and for each multicast group that it learned it creates a unique single- or multi-source PW tree.

A MAC address of the multicast group of interest is used to compute an mTAI that serves as the opaque value in MLDP label mapping to create the new multipoint PW tree. Essentially what is created is a separate multipoint PW tree per MAC address. Each PE router that is interested in the same MAC address will join to the same single- or multi-source PW tree in the core. The root PE router will receive the label mapping message, decode the MAC address from the opaque encoding and know exactly which packets to forward on the PW. Multicast packets are then directed to the interested PE leaf routers.

The advantages of this approach for building multipoint PWs using MLDP are the use of a group-specific PW leaf identifier that provides a means to unambiguously identify all L2 leaf interfaces and per-multipoint PW tree state belonging to a particular single- or multi-source multipoint PW. This facilitates the management and receiver-driven setup of multipoint PWs. Another advantage is the use of a single control protocol (rather the two separate protocols as is the case with point-to-point PWs) to dynamically build single- or multi-source multipoint PWs. This significantly reduces the amount of provisioning work needed to support an L2 multipoint service.

Other advantages include optimization of network resources by the efficient replication of PW-encapsulated packets within the core of the MPLS network, and the ability to enable providers with MPLS LDP backbones to employ the same LDP-based control plane to incrementally introduce and deploy new services based on multipoint Layer 2 Virtual Private Networks (L2VPN)s. This is important given that the vast majority of MPLS networks already use LDP in the backbone for unicast traffic.

Referring now in particular to FIG. 4, L2 interfaces (1, 2, 5, 6 and 7) on the PE leaf routers 68, 70 and 72 are configured with mTAI="G". L2 interfaces (3, 4) on PE leaf routers 68 and 70 are configured with mTAI="R". The PE leaf routers are also configured with an multipoint PW root identifier (SAI=1 for 56 and SAI=2 for 58) pointing to the respective root PE routers (56 and 58). MLDP computes opaque value for each <SAI, mTAI> (one for "green PW" and one for "red PW") and propagates this information upstream towards the root PE routers 56 and 58. The opaque value (and corresponding multipoint PW state) is installed in all routers along the tree between the root and leaf PE routers. These include core routers 60, 64, and 66.

In this example, two multipoint PWs are illustrated, a green PW from ingress SAI=1 interface to mTAI="G" leaf interfaces (1,2,5,6,7) and a red PW from ingress SAI=2 interface to mTAI="R" leaf interfaces (3,4). MLDP manages per Multipoint PW state on the PE and P routers. The scalability is O (the number of multipoint PWs). This environment provides better optimality at the expense of more state and does not make use of P2MP RSVP-TE, PIM, etc. The mTAI binds groups of L2 leaf interfaces to multipoint PW tree, analogous to IP multicast group address, and plays same role as TAI does for unicast PWs, that is binding the egress L2 interface to a PW.

For the Green PW, a packet from source 52 is forwarded to root PE router 56 where a PW label is imposed. From root PE router 56 the packet is forwarded to Core Router 60. From core router 60 the packet is forwarded to core router 64 where the packet is replicated and sent to egress PE router 68 and core router 66. At core router 66 the packet is again replicated and sent to PE leaf routers 70 and 72. At PE leaf router 68 the PW label is removed and the packet is forwarded out L2 leaf interfaces 1 and 2, while at PE leaf router 70 the packet is forwarded out L2 leaf interface 5 and on PE leaf router 72 to L2 leaf interfaces 6 and 7. The packets are then forwarded to respective CE routers from the L2 interfaces 1, 2, and 5-7.

For the Red PW, a packet from source 54 is forwarded to root PE router 58 where a PW label is imposed. From root PE router 58 the packet is forwarded to Core Router 60. From core router 60 the packet is forwarded to core router 64 where the packet is replicated and sent to PE leaf routers 68 and 70. At PE leaf router 68 the packet is forwarded out L2 leaf interface 3, while at PE leaf router 70 the packet is forwarded onto L2 leaf interface 4. The packets are then forwarded to respective CE routers from the L2 interfaces 3 and 4. In such a manner, packet replication is performed in the core, which in turn optimizes bandwidth of the network.

Figure 5A:
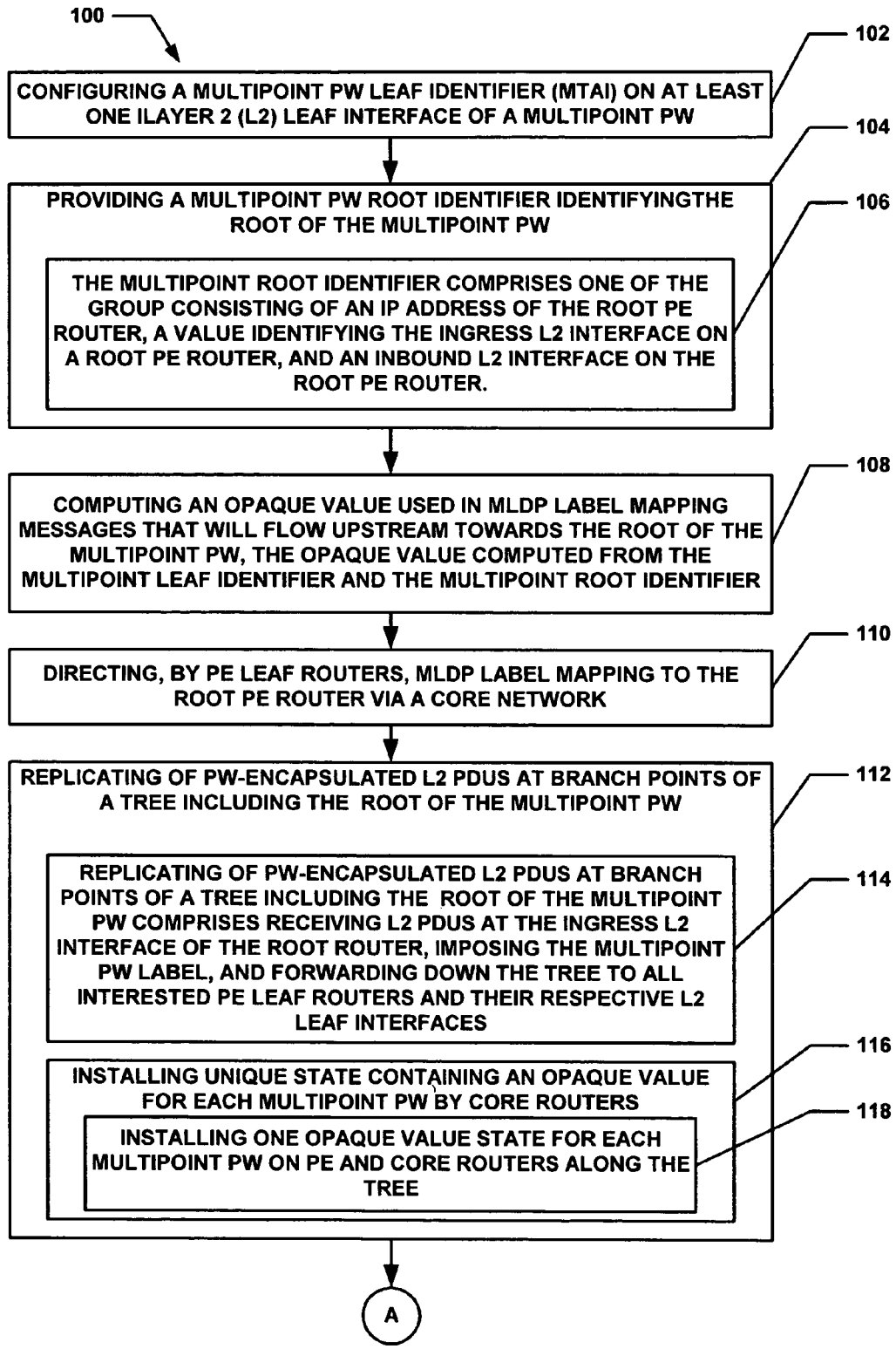
FIGS. 5A and 5b depict a particular embodiment of a flow diagram for a method of building multipoint Pseudo wires using MLDP.
Figure 5B:
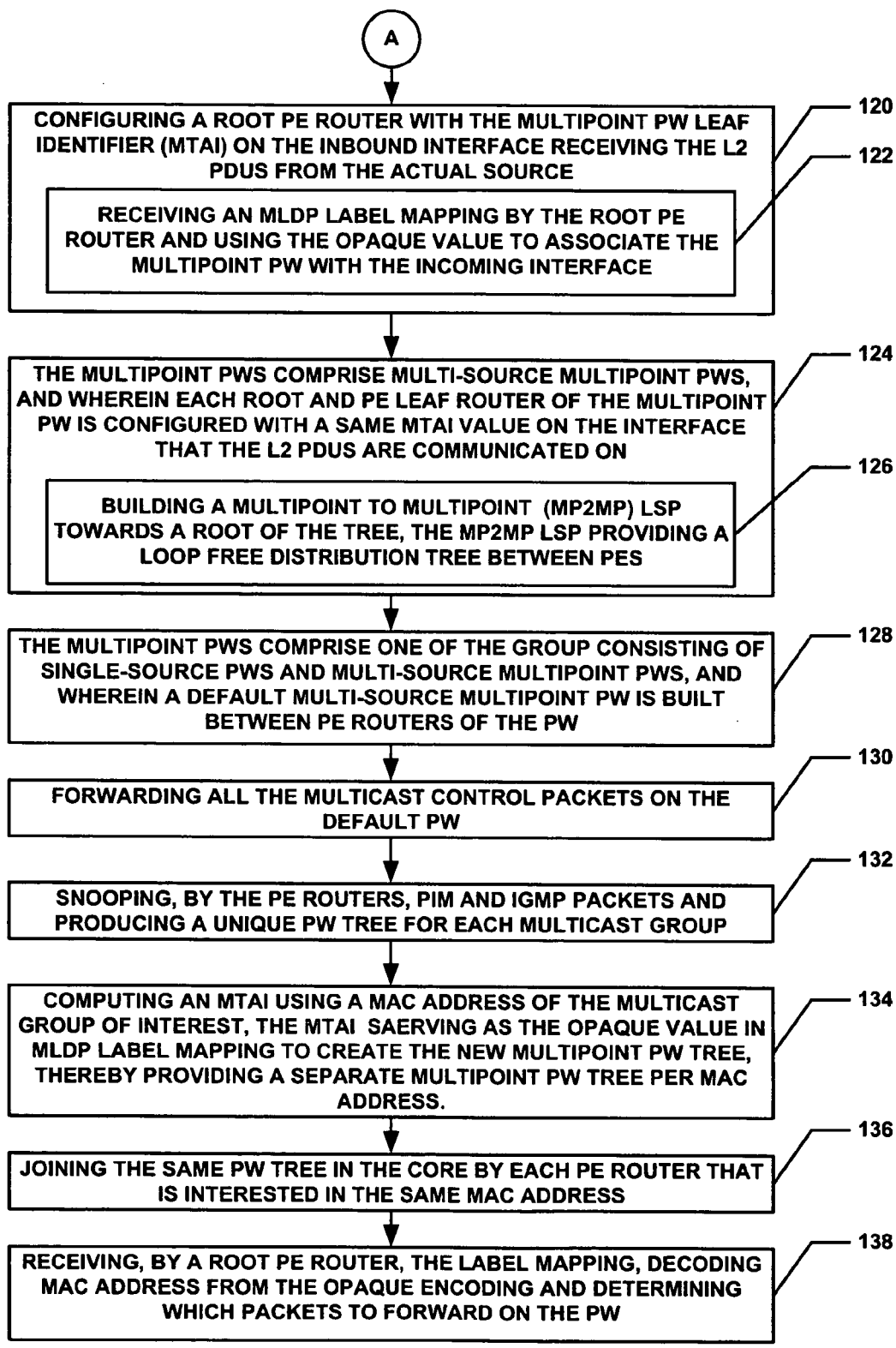

A flow chart of the presently disclosed method is depicted in FIGS. 5A and 5B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a particular embodiment of a method 100 of building multipoint Pseudo wires (PWs) using Multipoint Label Distribution Protocol (MLDP) is shown. The method begins with processing block 102 which discloses configuring a multipoint PW leaf identifier (mTAI) on at least one Layer 2 (L2) interfaces that will become part of the multipoint PW.

Processing block 104 states providing a multipoint PW root identifier identifying the PE router(s) that serve as the root of the multipoint PW. As shown in processing block 106 the multipoint root identifier is comprised one of the group consisting of an IP address of the root PE router, a value identifying the ingress L2 interface on the root PE router and an inbound L2 interface ob the root PE router.

Processing block 108 discloses computing an opaque value used in MLDP label mapping messages that will flow upstream towards the root of the multipoint PW, the opaque value computed from the multipoint PW leaf identifier and the multipoint PW root identifier. Processing block 110 states directing, by PE leaf routers, MLDP label mapping to the source root PE router via a core network.

Processing block 112 recites replicating of PW-encapsulated L2 PDUs at branch points of a tree including the root of the multipoint PW. As shown in processing block 114, replicating of PW-encapsulated L2 PDUs at branch points of a tree including at least the root of the multipoint PW comprises receiving L2 PDUs at the ingress L2 interface of the root router, imposing the multipoint PW label, and forwarding down the tree to all interested PE leaf routers and their respective L2 leaf interfaces. As recited in processing block 116, the replicating may further include installing unique state containing an opaque value for each multipoint PW by core routers. The installing an opaque value may include, as shown in processing block 118, installing one opaque value state for each multipoint PW on PE and core routers along the tree.

Processing block 120 discloses configuring a root PE router with the multipoint PW leaf identifier (mTAI) on the inbound interface receiving the L2 PDUs from the actual source. This may include, as described by processing block 122, receiving an MLDP label mapping by the source PE router and using the opaque value to associate the multipoint PW with the incoming interface.

Processing block 124 states the multipoint PWs comprise multi-source multipoint PWs, and wherein each PE router of the multipoint PW is configured with a same mTAI value on the interface the L2 PDUs are communicated on. This can further include, as shown in processing block 126, building a multipoint to multipoint (MP2MP) LSP towards a root of the tree, the MP2MP LSP providing a loop free distribution tree between PEs.

Processing block 128 discloses the multipoint PWs comprise one of the group consisting of single-source PWs and multi-source multipoint PWs, and wherein a default multi-source multipoint PW is built between PE routers of the PW. Processing block 130 states forwarding all the multicast control packets on the default PW.

Processing block 132 recites snooping, by the PE routers, PIM and IGMP packets and producing a unique PW tree for each multicast group. This may further include, as shown in processing block 134 computing an mTAI using a MAC address of the multicast group of interest, the mTAI serving as the opaque value in MLDP label mapping to create the new multipoint PW tree, thereby providing a separate multipoint PW tree per MAC address.

Processing continues with processing block 136 which recites joining the same PW tree in the core by each PE router that is interested in the same MAC address. Processing block 138 discloses receiving, by a root PE router, the label mapping, decoding MAC address from the opaque encoding and determining which packets to forward on the PW.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of building multipoint Pseudo Wires (PWs) using Multipoint Label Distribution Protocol (MLDP) comprising: configuring a multipoint PW leaf identifier (mTAI) on at least one Layer 2 (L2) leaf interface of a multipoint PW; providing a multipoint PW root identifier identifying a root provider edge (PE) router of the multipoint PW; computing an opaque value used in MLDP label mapping messages that will flow upstream towards the root of the multipoint PW, said opaque value computed from said multipoint leaf identifier and said multipoint PW root identifier; and directing, by PE leaf routers, MLDP label mapping to the root PE router via a core network.

2. The method of claim 1 further comprising replicating of PW encapsulated L2 packet data units (PDUs) at branch points of a tree including the root of the multipoint PW.

3. The method of claim 2 further comprising installing a unique state containing an opaque value for each multipoint PW by core routers.

4. The method of claim 3 further comprising installing one opaque value state for each multipoint PW on PE and core routers along the tree.

5. The method of claim 1 wherein said multipoint PW root identifier comprises one of a group consisting of an IP address of the root PE router, and a value identifying an ingress L2 interface on the root PE router.

6. The method of claim 1 further comprising configuring a root PE router with the multipoint PW leaf identifier (mTAI) on the inbound interface receiving the L2 packet data units (PDUs) from the actual source.

7. The method of claim 6 further comprising receiving an MLDP label mapping by the root PE router and using the opaque value to associate the multipoint PW with the ingress L2 interface.

8. The method of claim 2 wherein said replicating of PW-encapsulated L2 PDUs at branch points of a tree including the root of the multipoint PW comprises receiving L2 PDUs at the ingress L2 interface of the root router, imposing a multipoint PW label, and forwarding down the tree to all interested PE leaf routers and their respective L2 leaf interfaces.

9. The method of claim 1 wherein said multipoint PWs comprise multi-source multipoint PWs, and wherein each root and PE leaf router of the multipoint PW are configured with a same mTAI value on interface(s) that the L2 packet data units (PDUs) are communicated on.

10. The method of claim 9 further comprising building a multipoint to multipoint (MP2MP) LSP towards a root of the tree, the MP2MP LSP providing a loop free distribution tree between PEs.

11. The method of claim 1 wherein said multipoint PWs comprise one of the single-source PWs and multi-source multipoint PWs, and wherein a default multi-source multipoint PW is built.

12. The method of claim 11 further comprising forwarding multicast control packets on the default PW.

13. The method of claim 11 further comprising snooping protocol independent multicast (PIM) and internet group management protocol (IGMP) packets and producing a unique PW tree for each multicast group.

14. The method of claim 12 further comprising computing an mTAI using a media access control (MAC) address of the multicast group of interest, said mTAI serving as the opaque value in MLDP label mapping to create a separate multipoint PW tree per MAC address.

15. The method of claim 14 further comprising joining a same PW tree in the core by each PE router that is interested in the same MAC address.

16. The method of claim 15 further comprising receiving, by a root PE router, the MDLP label mapping, decoding MAC address from the opaque encoding and determining which packets to forward on the PW.

17. A non-transitory computer readable medium having computer readable code thereon, which when executed by a processor implements building multipoint Pseudo Wires (PWs) using Multipoint Label Distribution Protocol (MLDP), the non-transitory computer readable medium comprising:
  instructions for configuring a multipoint PW leaf identifier (mTAI) on at least one Layer 2 (L2) leaf interface of a multipoint PW;
  instructions for providing a multipoint PW root identifier identifying a root provider edge (PE) router of the multipoint PW, wherein said multipoint root identifier comprises one of the group consisting of an IP address of the root PE router, and a value identifying an the ingress L2 interface on the root PE router;
  instructions for computing an opaque value used in MLDP label mapping messages that will flow upstream towards the root of the multipoint PW, said opaque value computed from said multipoint leaf identifier and said multipoint PW root identifier;
  instructions for directing, by PE leaf routers, MLDP label mapping to the root PE router via a core network;
  instructions for replicating of PW-encapsulated L2 packet data units (PDUs) at branch points of a tree including the root of the multipoint PW, said replicating comprising receiving L2 PDUs at the ingress router, imposing the multipoint PW label, and forwarding down the tree to all interested PE leaf routers and their respective L2 leaf interfaces.

18. The non-transitory computer readable medium of claim 17 further comprising:
  instructions for installing a unique state containing an opaque value for each multipoint PW by core routers;
  instructions for installing one opaque value state for each multipoint PW on PE and core routers along the tree;
  instructions for configuring a root PE router with the multipoint PW leaf identifier (mTAI) on the inbound interface receiving the L2 PDUs from the actual source; and
  instructions for receiving an MLDP label mapping by the root PE router and using the opaque value to associate the multipoint PW with the ingress L2 interface.

19. The non-transitory computer readable medium of claim 17 wherein said multipoint PWs comprise multi-source multipoint PWs, wherein each PE router of the multipoint PW is configured with a same mTAI value on an interface PDUs are communicated on, said medium further comprising instructions for building a multipoint to multipoint (MP2MP) label switched paths (LSP) towards a root of the tree, the MP2MP LSP providing a loop free distribution tree between PE's.

20. The non-transitory computer readable medium of claim 17 wherein said multipoint PWs comprise one of single-source PWs and multi-source multipoint PWs, wherein a default multi-source multipoint PW is built between PE routers, said medium further comprising instructions for forwarding all the multicast control packets, and instructions for snooping protocol independent multicast (PIM) and internet group management protocol (IGMP) packets and producing a unique PW tree for each multicast group.

21. The non-transitory computer readable of claim 20 further comprising instructions for computing an mTAI using a media access control (MAC) address of the multicast group of interest, said mTAI serving as the opaque value in MLDP label mapping to create a separate multipoint PW tree per MAC address, instructions for joining a same PW tree in the core by each PE router that is interested in the same MAC address, and instructions for receiving, by a source PE router, the MLDP label mapping, decoding MAC address from the opaque encoding and determining which packets to forward on the PW.

22. A network system comprising:
  a memory;
  a processor;
  a communications interface;
  an interconnection mechanism coupling the memory, the processor and the communications interface; and
  wherein the memory is encoded with an application that when performed on the processor, provides a process for building multipoint Pseudo Wires (PWs) using Multipoint Label Distribution Protocol (MLDP), the process causing the network system to be capable of performing the operations of:
  configuring a multipoint PW leaf identifier (mTAI) on at least one Layer 2 (L2) leaf interface of a multipoint PW;
  providing a multipoint PW root identifier identifying a root provider edge (PE) router of the multipoint PW, wherein said multipoint root identifier comprises one of the group consisting of an IP address of the root PE router, and a value identifying an ingress L2 interface on the root PE router;
  computing an opaque value used in MLDP label mapping messages that will flow upstream towards said one of the group consisting of a source of the multipoint PW and a root of the multipoint PW, said opaque value computed from said multipoint leaf identifier and said multipoint PW root identifier; and
  directing, by PE leaf routers, MLDP label mapping to the root PE router via a core network;
  replicating of PW-encapsulated L2 PDUs at branch points of a tree including a root of the multipoint PW, said replicating comprising receiving L2 packet data units (PDUs) at the ingress L2 interface of the root PE router, imposing the multipoint PW label, and forwarding down the tree to all interested PE leaf routers and their respective L2 leaf interfaces.

23. The network system of claim 22 wherein said multipoint PWs comprise multisource multipoint PWs, wherein each PE router of the multipoint PW is configured with a same mTAI value on L2 interface(s) PDUs are communicated on, wherein a multipoint to multipoint (MP2MP) label switched path (LSP) is built towards a root of the tree, the MP2MP LSP providing a loop free distribution tree between PE's.

24. The network system of claim 23 wherein said multipoint PWs comprise one of a group consisting of single-source PWs and multi-source multipoint PWs, wherein a default multi-source multipoint PW is built, wherein multicast control packets are forwarded on the default multi-source multipoint PW, and wherein the PE routers snoop protocol independent multicast (PIM) and internet group management protocol (IGMP) packets and produce a unique PW tree for each multicast group.

* * * * *